(12) United States Patent
Yamashita

(10) Patent No.: US 8,965,540 B2
(45) Date of Patent: Feb. 24, 2015

(54) ELECTRONIC APPARATUS AND DATA OUTPUT METHOD

(75) Inventor: Makoto Yamashita, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 572 days.

(21) Appl. No.: 13/310,171

(22) Filed: Dec. 2, 2011

(65) Prior Publication Data

US 2012/0217801 A1 Aug. 30, 2012

(30) Foreign Application Priority Data

Feb. 28, 2011 (JP) ................................. 2011-043066

(51) Int. Cl.
*G06F 19/00* (2011.01)
*H02J 13/00* (2006.01)
*H04N 21/41* (2011.01)
*F24F 11/00* (2006.01)

(52) U.S. Cl.
CPC .......... *H02J 13/001* (2013.01); *H04N 21/4131* (2013.01); *Y04S 10/40* (2013.01); *F24F 2011/0091* (2013.01); *Y02B 70/3216* (2013.01); *Y02B 70/3275* (2013.01); *Y04S 20/221* (2013.01); *Y04S 20/244* (2013.01)
USPC ............................................. 700/83; 345/24

(58) Field of Classification Search
USPC .................... 700/17, 83, 286; 340/22; 345/24
See application file for complete search history.

(56) References Cited

U.S. PATENT DOCUMENTS

| | | | | |
|---|---|---|---|---|
| 4,001,808 A | * | 1/1977 | Ebihara et al. | 340/653 |
| 5,315,236 A | * | 5/1994 | Lee | 324/157 |
| 6,636,026 B1 | * | 10/2003 | Nomoto | 323/318 |
| 7,508,169 B2 | * | 3/2009 | Miskovic et al. | 320/132 |
| 8,165,724 B2 | * | 4/2012 | Kerofsky | 700/291 |
| 2006/0176240 A1 | * | 8/2006 | Nozaki et al. | 345/1.2 |
| 2010/0007515 A1 | * | 1/2010 | Ito | 340/825.36 |

FOREIGN PATENT DOCUMENTS

| | | |
|---|---|---|
| JP | 11-296771 | 10/1999 |
| JP | 2004-205249 | 7/2004 |
| JP | 2006-162371 | 6/2006 |
| JP | 2008-089433 | 4/2008 |
| JP | 2008-202985 | 9/2008 |

(Continued)

OTHER PUBLICATIONS

Japanese First Office Action for corresponding Japanese Application No. 2012-189601, mailed Oct. 2, 2012, in 7 pages.

(Continued)

*Primary Examiner* — Kidest Bahta
(74) *Attorney, Agent, or Firm* — Knobbe, Martens, Olson & Bear LLP

(57) ABSTRACT

According to one embodiment, an electronic apparatus includes a receiver, a generator, an output module, a reception module, and a controller. The receiver is configured to receive power information associated with power consumption of respective external apparatuses from the respective external apparatuses. The generator is configured to generate display data to relatively display power consumption of the respective external apparatuses based on the power information. The output module is configured to output the display data. The reception module is configured to accept a selection of a first external apparatus from the respective external apparatuses. The controller is configured to control the first external apparatus.

9 Claims, 9 Drawing Sheets

(56) References Cited

FOREIGN PATENT DOCUMENTS

| JP | 2008-204278 | 9/2008 |
|---|---|---|
| JP | 2008-261826 | 10/2008 |
| JP | 2008-298754 | 12/2008 |
| JP | 2009-074966 | 4/2009 |
| JP | 2009-281855 | 12/2009 |

OTHER PUBLICATIONS

Japanese First Office Action for corresponding Japanese Application No. 2013-095726, mailed May 28, 2013, in 6 pages.
Japanese First Office Action for corresponding Japanese Application No. 2011-043066, mailed Feb. 21, 2012.

* cited by examiner

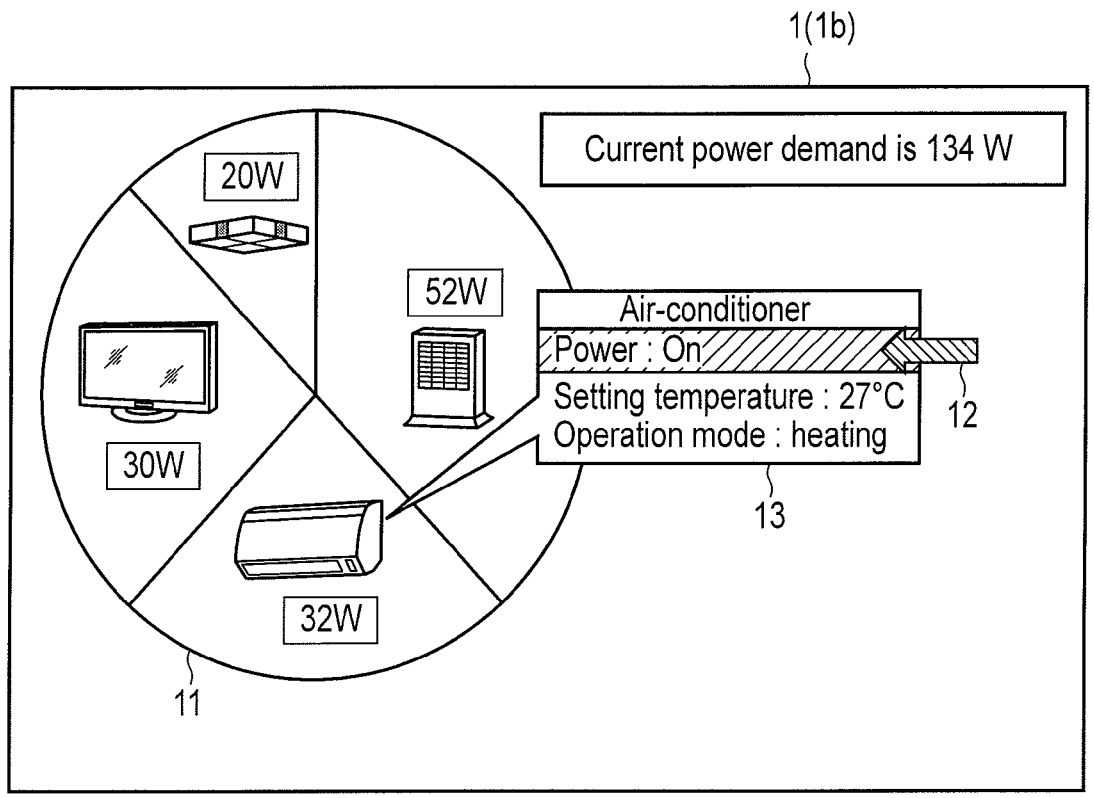
F I G. 3
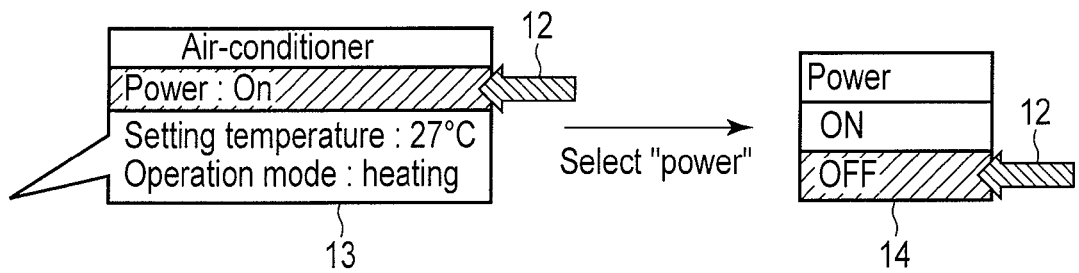
F I G. 4

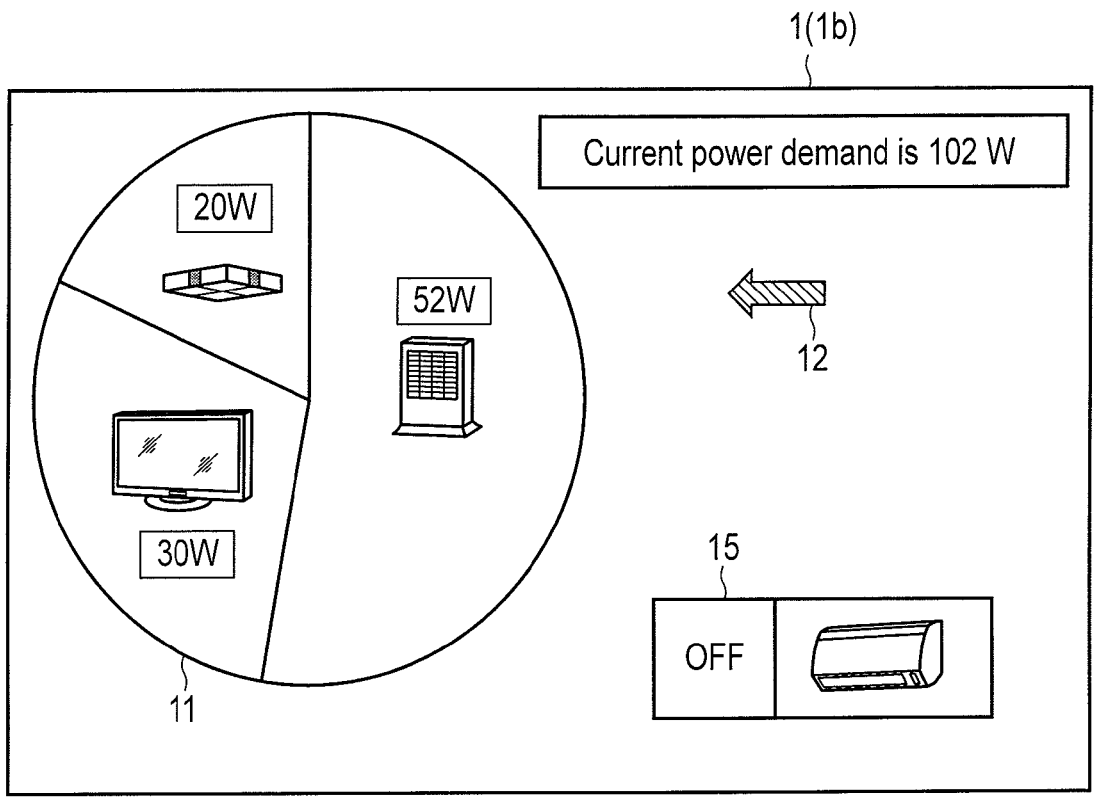
F I G. 5
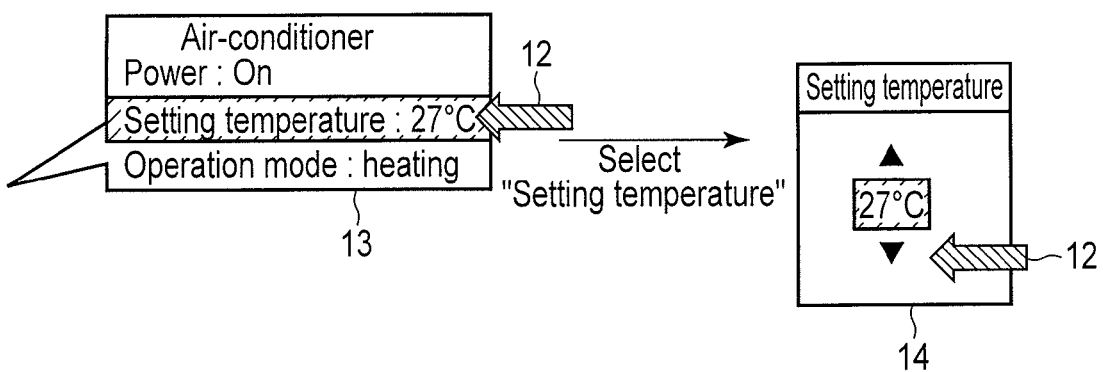
F I G. 6

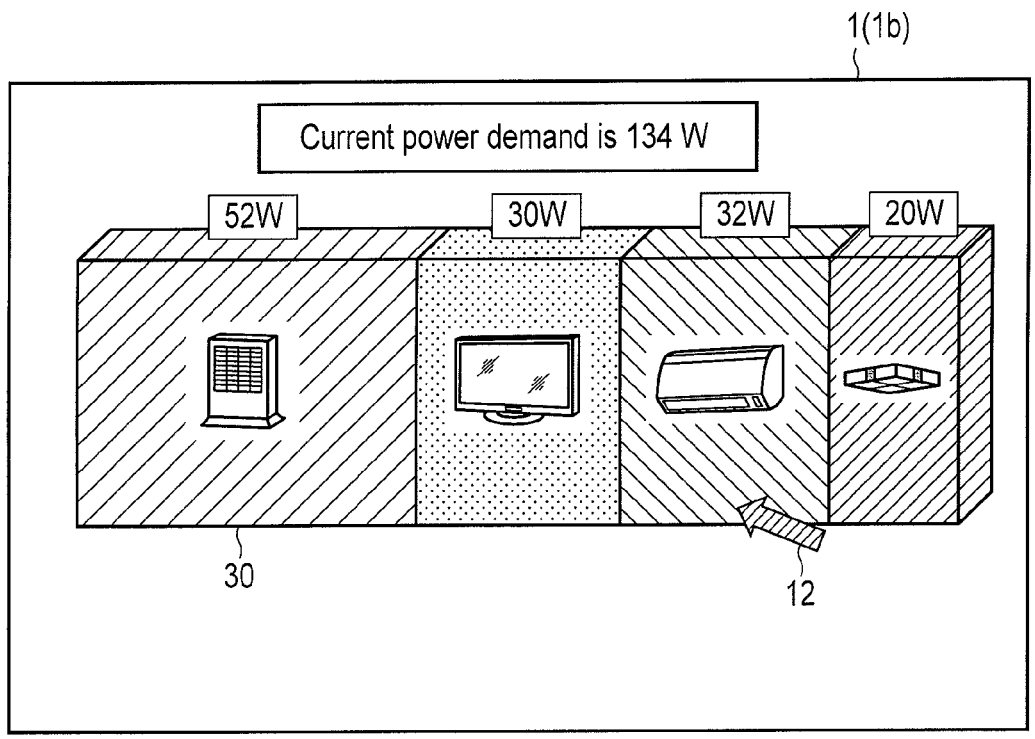
F I G. 7
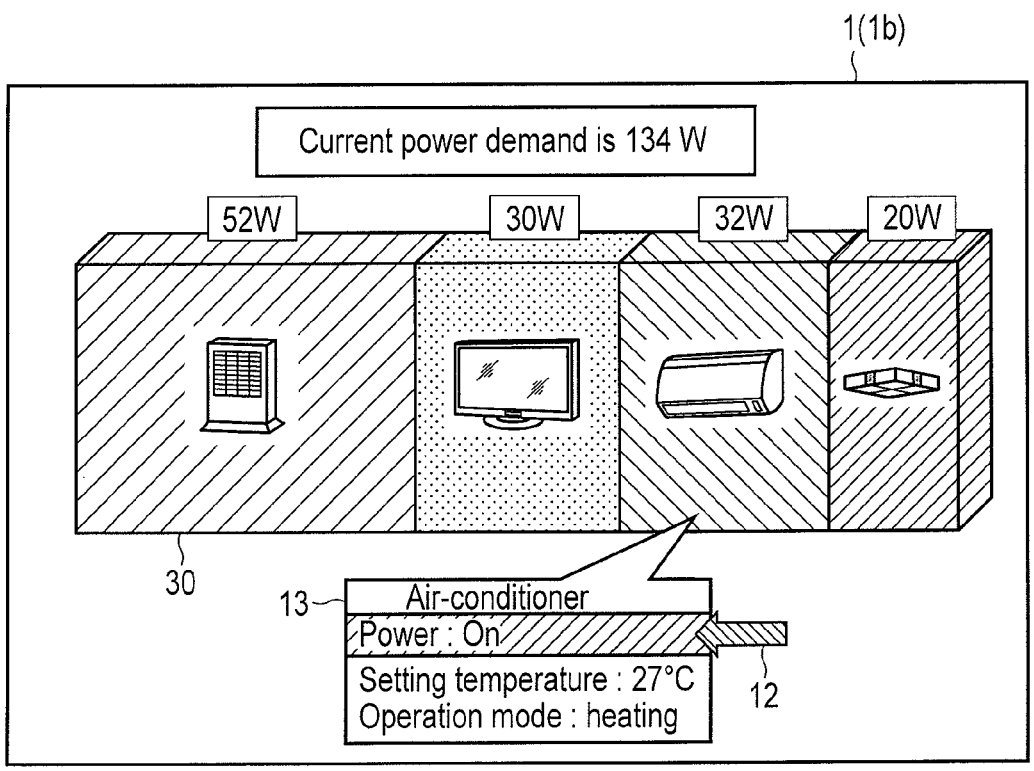
F I G. 8

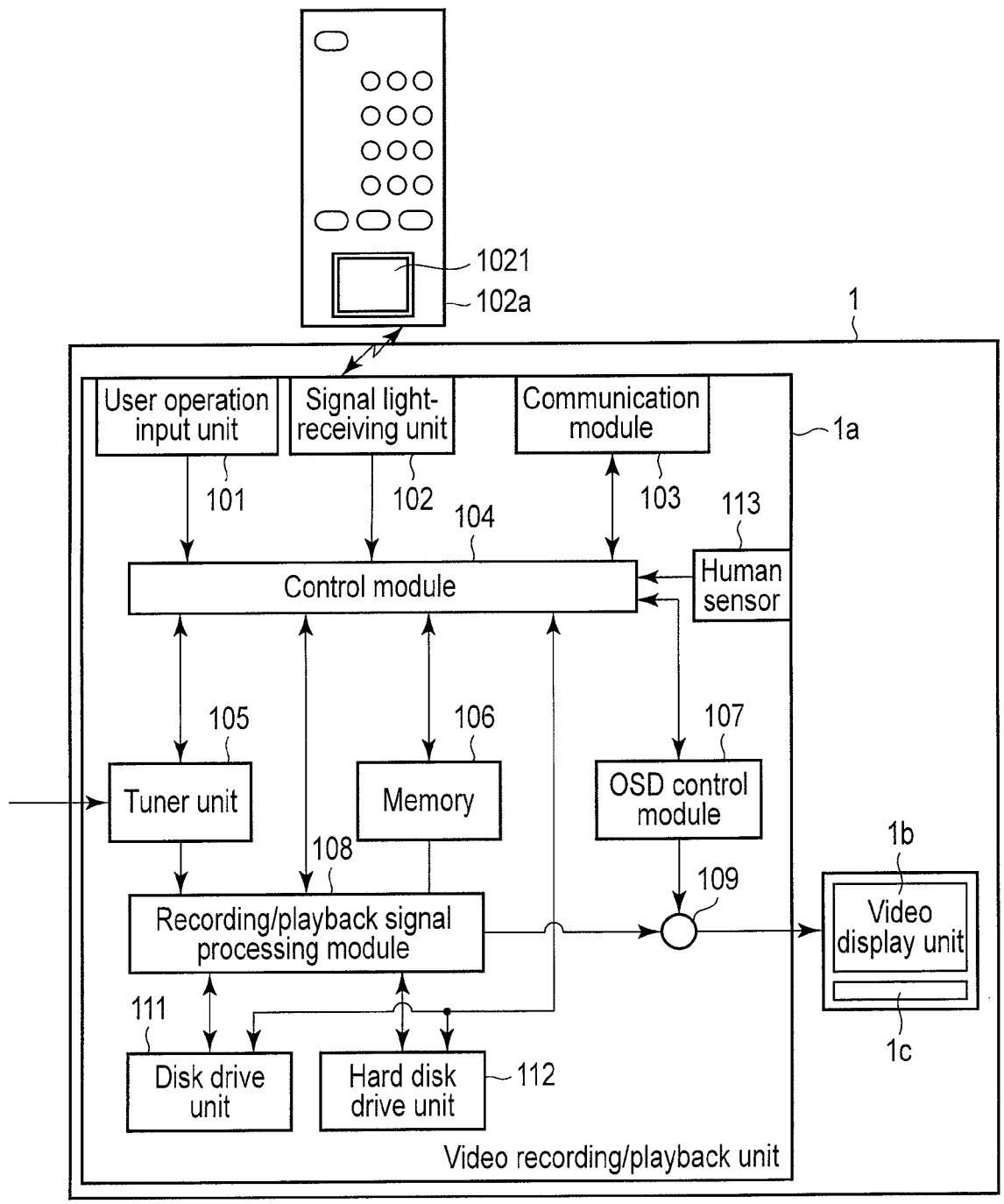
F I G. 11

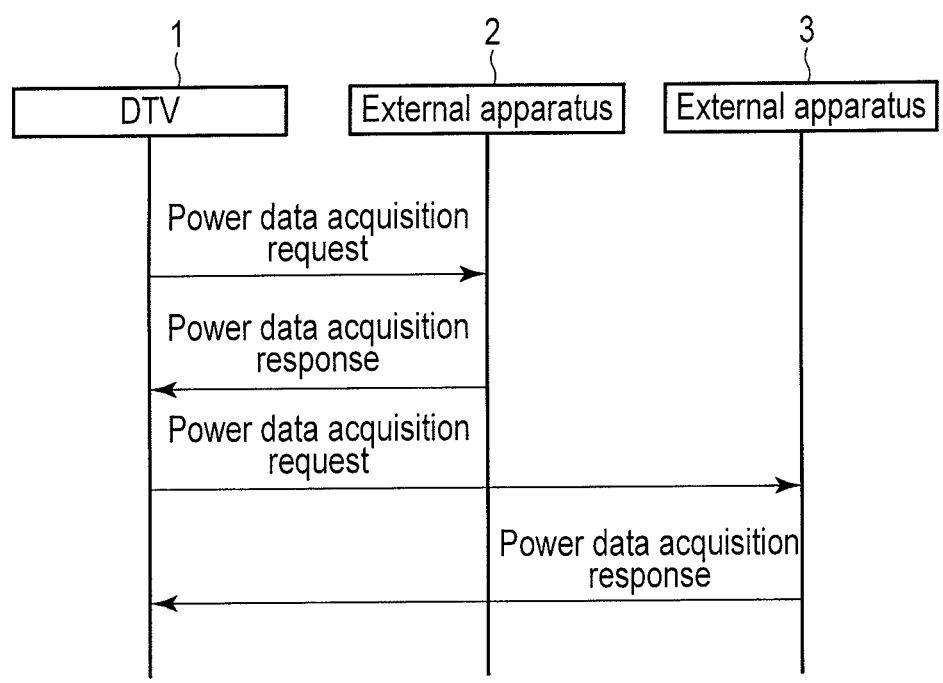
F I G. 12

ELECTRONIC APPARATUS AND DATA OUTPUT METHOD

CROSS-REFERENCE TO RELATED APPLICATIONS

This application is based upon and claims the benefit of priority from prior Japanese Patent Application No. 2011-043066, filed Feb. 28, 2011, the entire contents of which are incorporated herein by reference.

FIELD

Embodiments described herein relate generally to an electronic apparatus and data output method.

BACKGROUND

In recent years, electronic apparatuses such as digital TVs have prevailed remarkably. Such electronic apparatus is connected to an external apparatus via a wireless or wired communication, receives data from the external apparatus, and can provide the received data to the user. Furthermore, some of such electronic apparatuses can control the operation of the external apparatus.

In recent escalation of interest in energy savings, for example, a technique for monitoring power demands of a plurality of external apparatuses using a single computer has been proposed.

It is demanded to control respective external apparatuses in addition to confirmation of the power demands of the respective external apparatuses.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a view showing a display example of power demands of respective external apparatuses and a control menu;

FIG. 4 is a view showing a detailed display example of a control menu;

FIG. 5 is a view showing a display example of power demands of respective external apparatuses;

FIG. 6 is a view showing a detailed display example of a control menu;

FIG. 7 is a view showing a display example of power demands of respective external apparatuses;

FIG. 8 is a view showing a display example of power demands of respective external apparatuses and a control menu;

FIG. 11 is a schematic block diagram showing an example of the arrangement of a DTV according to the first and second embodiments;

FIG. 12 is a chart for explaining a first example of power demand data acquisition processing;

DETAILED DESCRIPTION

Various embodiments will be described hereinafter with reference to the accompanying drawings.

In general, according to one embodiment, an electronic apparatus includes a receiver, a generator, an output module, a reception module, and a controller. The receiver is configured to receive power information associated with power consumption of respective external apparatuses from the respective external apparatuses. The generator is configured to generate display data to relatively display power consumption of the respective external apparatuses based on the power information. The output module is configured to output the display data. The reception module is configured to accept a selection of a first external apparatus from the respective external apparatuses. The controller is configured to control the first external apparatus.

Figure 1:
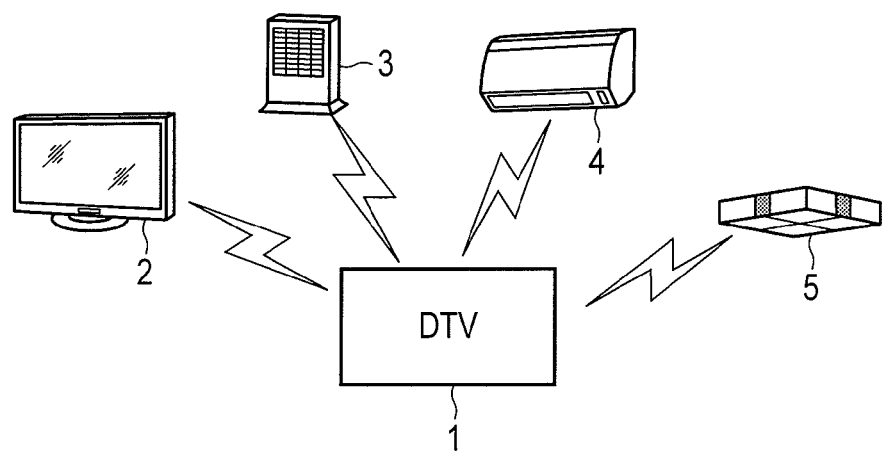
FIG. 1 is a view showing an example of a power demand display system according to the first embodiment.

FIG. 1 shows an example of a power demand display system according to the first embodiment. As shown in FIG. 1, for example, the power demand display system is configured by a digital TV (DTV) 1, and external apparatuses 2, 3, 4, and 5.

The DTV 1 is connected to the external apparatuses 2, 3, 4, and 5 via wireless or wired communications. To interfaces between the DTV 1 and external apparatuses 2, 3, 4, and 5, various communication techniques can be applied. For example, communication techniques such as Bluetooth®, ZigBee®, Wi-Fi®, and PLC can be applied to the interfaces. For example, the DTV 1 can receive various kinds of data such as power demand data (power information associated with power consumption of respective external apparatuses) from the external apparatuses 2, 3, 4, and 5, and can send control signals required to control the operations of the external apparatuses 2, 3, 4, and 5.

Each of the external apparatuses 2, 3, 4, and 5 (that is, each external apparatus) has a wireless communication function, and can make wireless communications with the DTV 1. Each external apparatus can send power demand data (power information associated with power consumption of each external apparatus) to the DTV 1 using this wireless communication function. Also, each external apparatus can receive a control signal from the DTV 1, and can operate based on the control signal. For example, each external apparatus communicates with the DTV 1 via, for example, a short range wireless communication, and can send power demand data such as power demands of respective time zones, that per day, that per week, and that per month of the self apparatus.

Also, each external apparatus transits to a standby state (so-called power-off state) upon reception of a standby power supply, and transits to an operation state (so-called power-on state) upon reception of an operation power supply higher than the standby power. For example, upon reception of a power control signal from the DTV 1, the external apparatus in the standby state transits to the operation state by switching the power supply state from the standby power supply state to the operation power supply state. Also, upon reception of the power control signal from the DTV 1, the external apparatus in the operation state transits to the standby state by switching the power supply state from the operation power supply state to the standby power supply state.

Each external apparatus can communicate with the DTV 1 in both the standby and operation states.

Figure 9:
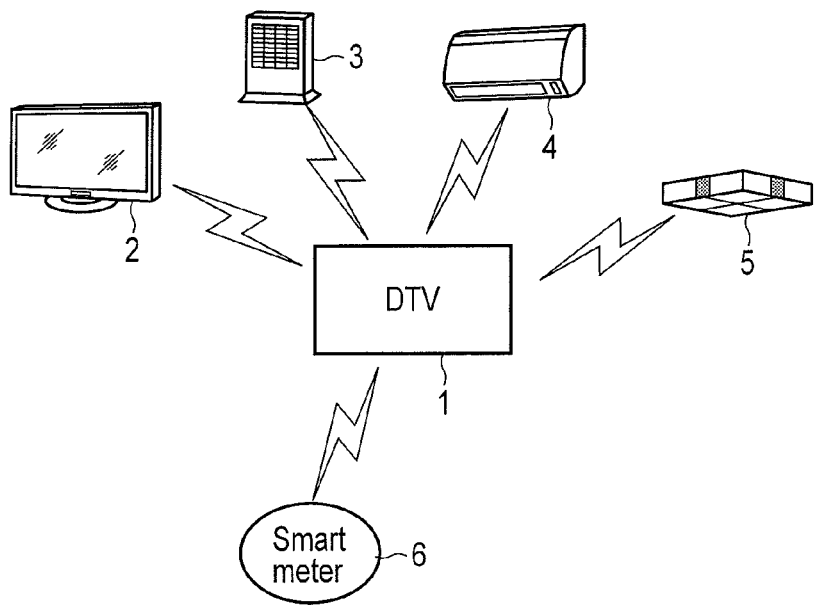
FIG. 9 is a view showing an example of a power demand display system according to the second embodiment.

FIG. 9 shows an example of a power demand display system according to the second embodiment. As shown in FIG. 9, the power demand display system is configured by a DTV 1, external apparatuses 2, 3, 4, and 5, and a smart meter 6.

The DTV 1 is connected to the external apparatuses 2, 3, 4, and 5 via wireless or wired communications, and also to the smart meter 6 via a wireless or wired communication. Various communication techniques can be applied to the interfaces between the DTV 1 and external apparatuses 2, 3, 4, and 5, and to that between the DTV 1 and smart meter 6. For example, the DTV 1 can receive various kinds of data such as power demand data from the external apparatuses 2, 3, 4, and 5, can receive various kinds of data such as smart energy data from the smart meter 6, and can send control signals required to control the operations of the external apparatuses 2, 3, 4, and 5. For example, the smart meter 6 is equipped in each home, and can communicate with power demand apparatuses (for example, those other than the external apparatuses 2, 3, 4, and 5) via, for example, a short range wireless communication to receive power demand data from each of the power demand apparatuses. Then, the smart meter 6 can display the power demand data of each power demand apparatus and total power demand data of those apparatuses, and can send the data to another apparatus. Furthermore, the smart meter 6 can manage power demands of respective time zones, that per day, that per week, and that per month of each power demand apparatus. Likewise, the smart meter 6 can manage total power demands of respective time zones, that per day, that per week, and that per month of each power demand apparatus. Moreover, the smart meter 6 can display these pieces of managed data and can send them to another apparatus. Such pieces of power demand-related data will be collectively referred to as smart energy data.

FIG. 11 shows a schematic arrangement of the DTV 1 according to the first and second embodiments. The first and second embodiments will explain output processing of various kinds of data (that of power demand data) by the DTV 1. However, the embodiments are not limited to the output processing of various kinds of data by the DTV 1. For example, the output processing of power demand data to be described below can be implemented by various recorders, players, computers, and the like which can output various kinds of data.

As shown in FIG. 11, the DTV 1 is configured by a video recording/playback unit 1a, video display unit 1b, and audio output unit 1c. For example, the aforementioned recorder is configured by the video recording/playback unit 1a, and the player is configured by a playback unit included in the video recording/playback unit 1a.

As shown in FIG. 11, the video recording/playback unit 1a includes a user operation input unit 101, signal light-receiving unit 102, communication module 103, control module (controller) 104, tuner unit 105, memory 106, OSD control module 107, recording/playback signal processing module 108, composition processing module 109, disk drive unit 111, hard disk drive unit 112, and human sensor 113.

The control module 104 can control program recording and playback operations, can control a power demand display operation (to be described later), and can control the operations of the external apparatuses 2, 3, 4, and 5. The communication module 103 can send various kinds of data to the respective external apparatuses, and can receive various kinds of data (for example, power demand data) from the respective external apparatuses. Also, the communication module 103 can send various kinds of data to the smart meter 6, and can receive various kinds of data (smart energy data) from the smart meter 6.

The memory 106 can store various kinds of data (for example, power demand data from each external apparatus and smart energy data from the smart meter 6) received by the communication module 103. For example, the memory 106 stores latest power demand data from each external apparatus, and latest smart energy data provided from the smart meter 6.

The tuner unit 105 tunes a broadcast signal of a designated channel, and inputs the tuned broadcast signal to the recording/playback signal processing module 108. When recording processing is designated, the recording/playback signal processing module 108 inputs a program content (video and audio signals) corresponding to the broadcast signal to the disk drive unit 111 or hard disk drive unit 112. The disk drive unit 111 records the input program content on an optical disk such as a DVD or Blu-ray® (BD). Alternatively, the hard disk drive unit 112 records the input program content on a hard disk. When playback processing is designated, the recording/playback signal processing module 108 outputs a program content corresponding to the broadcast signal to the video display unit 1b and audio output unit 1c via the composition processing module 109.

Subsequently, examples of various operations via a remote controller 102a will be described below. Various operations input via the user operation input unit 101 are substantially the same as those input via the remote controller 102a, and a description thereof will not be given.

The remote controller 102a has a plurality of keys, and sends commands corresponding to instructions input via these keys. The remote controller 102a has a cursor control pad 1021 as a reception module. The cursor control pad 1021 detects a user's touch operation, and sends a cursor control signal corresponding to the user's touch operation. The cursor control signal is that used to move a cursor displayed on the video display unit 1b, or to select an item displayed under the cursor. The signal light-receiving unit 102 receives a command and control signal from the remote controller 102a, and reports them to the control module 104.

Power demand display modes and external apparatus control modes by the power demand display systems according to the first and second embodiments will be described below.

First Power Demand Display

The communication module 103 of the DTV 1 receives pieces of power demand data from the respective external apparatuses. The OSD control module 107 of the DTV 1 generates display data required to relatively display power demands of the respective external apparatuses based on the pieces of power demand data of the respective external apparatuses, and the composition processing module 109 outputs the display data. In response to this, the video display unit 1b relatively displays the power demands of the respective external apparatuses based on the display data.

Figure 2:
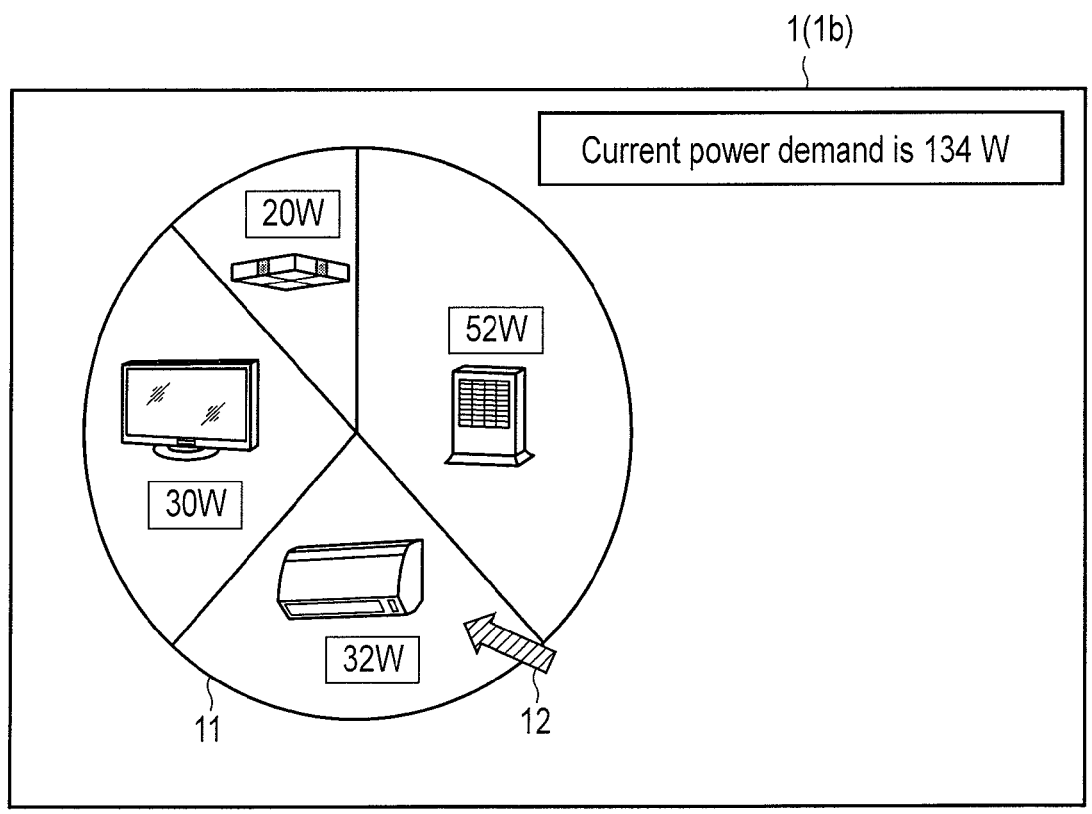
FIG. 2 is a view showing a display example of power demands of respective external apparatuses.

FIG. 2 shows a display example of power demands of the respective external apparatuses. For example, as shown in FIG. 2, the video display unit 1b displays percentages of power demands of the respective external apparatuses using a graph (for example, a circle graph 11), and also displays a total power demand of the respective external apparatuses. Furthermore, the video display unit 1b displays a pointer (for example, a free cursor 12) required to select an external apparatus to be controlled. The circle graph 11 includes icons corresponding to the respective external apparatuses, and power demand values of the respective external apparatuses. Thus, the user can intuitively recognize the percentages of power demands of the respective external apparatuses of the total power demand of all the apparatuses.

Note that the DTV 1 may change icon sizes of the respective external apparatuses according to the power demands of the respective external apparatuses so as to relatively display the power demands of the respective external apparatuses. For example, the DTV 1 may display an icon of an external apparatus which requires a very large power demand in a very large size, may display an icon of an external apparatus which requires a relatively large power demand in a relatively large size, may display an icon of an external apparatus which requires a relatively small power demand in a relatively small size, and may display an icon of an external apparatus which requires a very small power demand in a very small size.

First External Apparatus Control

The DTV 1 can control a selected external apparatus in response to a selection operation of the external apparatus. For example, the user can select an external apparatus to be controlled via a power demand display screen (for example, FIG. 2) using the cursor control pad 1021 (free cursor 12) of the remote controller 102a. The control module 104 of the DTV 1 instructs to output a control menu 13 (FIG. 3) required to control the selected external apparatus in response to the selection operation of the external apparatus. In response to this instruction, the OSD control module 107 generates display data, and the composition processing module 109 outputs the display data. In response to this, the video display unit 1b relatively displays the power demands of the respective external apparatuses, and the control menu 13 required to control the selected external apparatus based on the display data, as shown in FIG. 3.

The control menu 13 includes items (controllable items) according to the corresponding external apparatus. The communication module 103 receives data associated with the controllable items from each external apparatus, and the OSD control module 107 can generate display data required to display a control menu corresponding to that external apparatus based on the data associated with the controllable items from that external apparatus.

When the selected external apparatus is, for example, an air-conditioner, the control menu 13 corresponding to the selected external apparatus includes data such as a name (air-conditioner) of the external apparatus to be controlled, power (power-on state/power-off state), setting temperature, and operation mode. For example, the user can select a "power" item via the control menu 13 using the cursor control pad 1021 (free cursor 12) of the remote controller 102a. The control module 104 of the DTV 1 instructs to output a control menu 14 (FIG. 4) required to control the power state in response to the selection operation of the "power" item. In response to this instruction, the OSD control module 107 generates display data, and the composition processing module 109 outputs the display data. In response to this, the video display unit 1b displays the control menu 14 required to control the power state.

The control menu 14 includes, for example, on and off items. For example, the user can select the on or off item via the control menu 14 using the cursor control pad 1021 (free cursor 12) of the remote controller 102a. The control module 104 of the DTV 1 instructs to output a power control signal (power-off control signal) required to control the power state in response to the selection operation of, for example, the off item. In response to this instruction, the communication module 103 outputs the power control signal (power-off control signal) to the external apparatus to be controlled.

For example, the external apparatus to be controlled receives the power control signal, and transits to, for example, the standby state by switching the power supply state from the operation power supply state to the standby power supply state.

Second Power Demand Display

The external apparatus which has been switched from the operation state to the standby state reports to the DTV 1 that it is in the standby state. The control module 104 of the DTV 1 executes control to distinctly display the external apparatus in the standby state and those in the operation state based on the standby state report. In response to this control, the OSD control module 107 generates display data required to relatively display the power demands of the external apparatuses in the operation state and to distinctly display the external apparatuses in the operation state from that in the standby state, and the composition processing module 109 outputs the display data. In response to this, the video display unit 1b relatively displays the power demands of the external apparatuses in the operation state, and distinctly displays the external apparatuses in the operation state from that in the standby state, as shown in, for example, FIG. 5.

As shown in FIG. 5, the power demands of the external apparatuses in the operation state are displayed using the circle graph 11, and the external apparatus in the standby state is displayed within a standby list area 15 without displaying its power demand in the circle graph 11. With this display, the user can intuitively identify the external apparatuses in the operation state from that in the standby state.

Second External Apparatus Control

The DTV 1 can control the selected external apparatus in the standby state in response to a selection operation of the external apparatus in the standby state. For example, the user can select the external apparatus in the standby state via the standby list area of the power demand display screen (for example, FIG. 5) using the cursor control pad 1021 (free cursor 12) of the remote controller 102a. The control module 104 of the DTV 1 instructs to output a control menu 13 (FIG. 6) required to control the selected external apparatus in the standby state in response to the selection operation of the external apparatus in the standby state. In response to this instruction, the OSD control module 107 generates display data, and the composition processing module 109 outputs the display data. In response to this, the video display unit 1b displays the control menu 13 required to control the selected external apparatus in the standby state, as shown in FIG. 6.

For example, the user can select an on item via the control menu 13 using the cursor control pad 1021 (free cursor 12) of the remote controller 102a. The control module 104 of the DTV 1 instructs to output, for example, a power control signal (power-on control signal) required to control the power state in response to the selection operation of the on item. In response to this instruction, the communication module 103 outputs the power control signal (power-on control signal) to the external apparatus to be controlled. For example, the external apparatus to be controlled receives the power control signal, and transits to the operation state by switching the power supply state from, for example, the standby power supply state to the operation power supply state.

The user can select a setting temperature item via the control menu 13 using the cursor control pad 1021 (free cursor 12) of the remote controller 102a. The control module 104 of the DTV 1 instructs to output a control menu 16 (FIG. 6) required to control the setting temperature in response to the selection operation of the setting temperature item. In response to this instruction, the OSD control module 107 generates display data, and the composition processing module 109 outputs the display data. In response to this, the video display unit 1b displays the control menu 16 required to control the setting temperature.

The control menu 16 includes, for example, temperature up and down items. For example, the user can select the temperature up or down item to set a temperature via the control menu 16 using the cursor control pad 1021 (free cursor 12) of the remote controller 102a. The control module 104 of the DTV 1 instructs to output a temperature control signal required to designate a temperature value set in response to the selection of the temperature up or down item. In response to this instruction, the communication module 103 outputs the temperature control signal to the external apparatus to be controlled. For example, the external apparatus to be controlled receives the temperature control signal, and controls a temperature value.

Third Power Demand Display

In the above description, the case has been mainly explained wherein the DTV 1 displays power demands of the respective external apparatuses using the circle graph. However, the embodiments are not limited to the power demand display mode of the respective external apparatuses using the circle graph.

For example, as shown in FIG. 7, the video display unit 1b of the DTV 1 may display percentages of the power demands of the respective external apparatuses using a bar graph (for example, a crossbar graph 30), and also display a total power demand of the respective external apparatuses. That is, the video display unit 1b builds up and displays the power demands of the respective external apparatuses using the crossbar graph 30.

For example, the user can select an external apparatus to be controlled via the power demand display screen (for example, FIG. 7) using the cursor control pad 1021 (free cursor 12) of the remote controller 102a. The control module 104 of the DTV 1 instructs to output a control menu 13 (FIG. 8) required to control the selected external apparatus in response to the selection operation of the external apparatus. In response to this instruction, the OSD control module 107 generates display data, and the composition processing module 109 outputs the display data. In response to this, the video display unit 1b relatively displays the power demands of the respective external apparatuses, and the control menu 13 required to control the selected external apparatus based on the display data, as shown in FIG. 8. The control of the external apparatus via the control menu 13 is as has been described above.

Fourth Power Demand Display

A power demand display mode by the power demand display system shown in FIG. 9 will be described below. As described above, the DTV 1 receives pieces of power demand data from respective external apparatuses, and also power demand data (for example, that in the entire home) from the smart meter 6.

Figure 10:
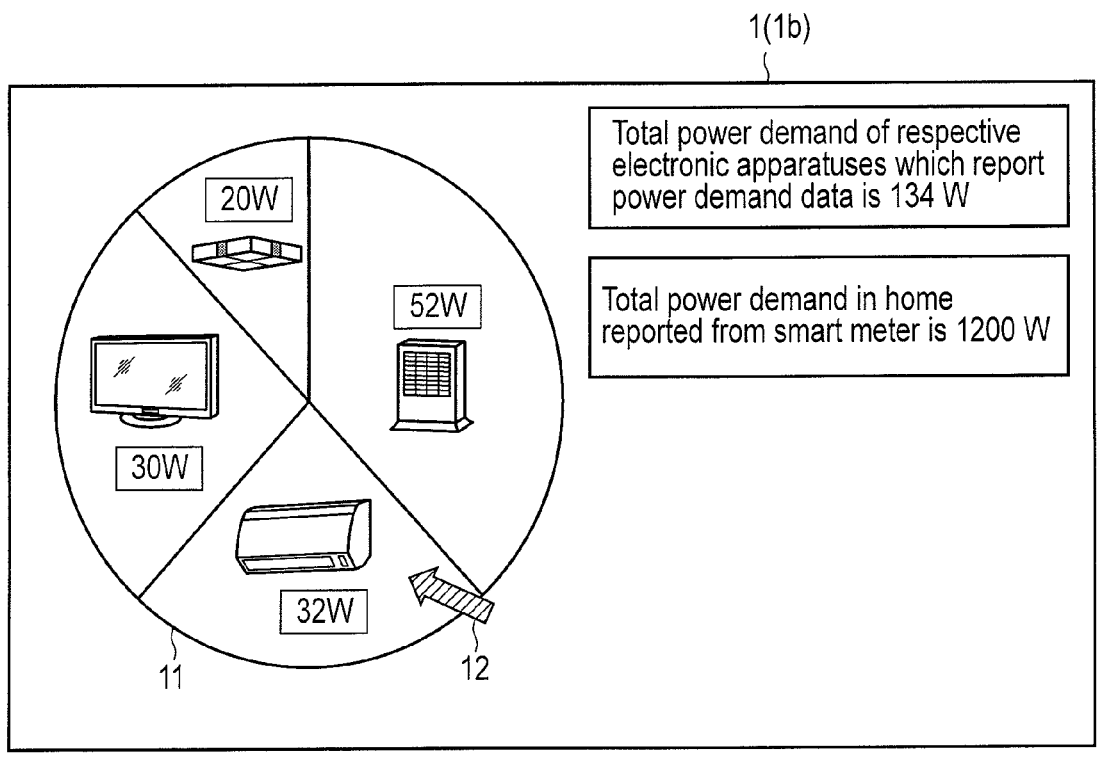
FIG. 10 is a view showing a display example of power demands of respective external apparatuses.

In response to this, as shown in, for example, FIG. 10, the video display unit 1b of the DTV 1 relatively displays power demands of the respective external apparatuses, displays the total power demand of the respective external apparatuses, and further displays the power demand of the entire home.

Acquisition processing of the power demand data by the DTV 1 will be described below.

First Example of Power Demand Data Acquisition

For example, the DTV 1 polls the respective external apparatuses at required times to acquire pieces of power demand data from the respective external apparatuses.

As shown in FIG. 12, in order to acquire power demand data from the external apparatus 2, the DTV 1 issues a power data acquisition request (power data acquisition command) to the external apparatus 2. Upon reception of the power data acquisition request, the external apparatus 2 measures the current power data (power demand) of itself, and returns a power data acquisition response to the power data acquisition request to the DTV 1. The power data acquisition response includes the current power demand value of the external apparatus 2.

By the similar processing, the DTV 1 acquires the power demand values from the external apparatuses 3, 4, and 5.

Second Example of Power Demand Data Acquisition

For example, each external apparatus reports power demand data (power demand value) to the DTV 1 at the time at which the power demand has changed. In response to this report, the DTV 1 acquires the power demand data from that external apparatus.

Figure 13:
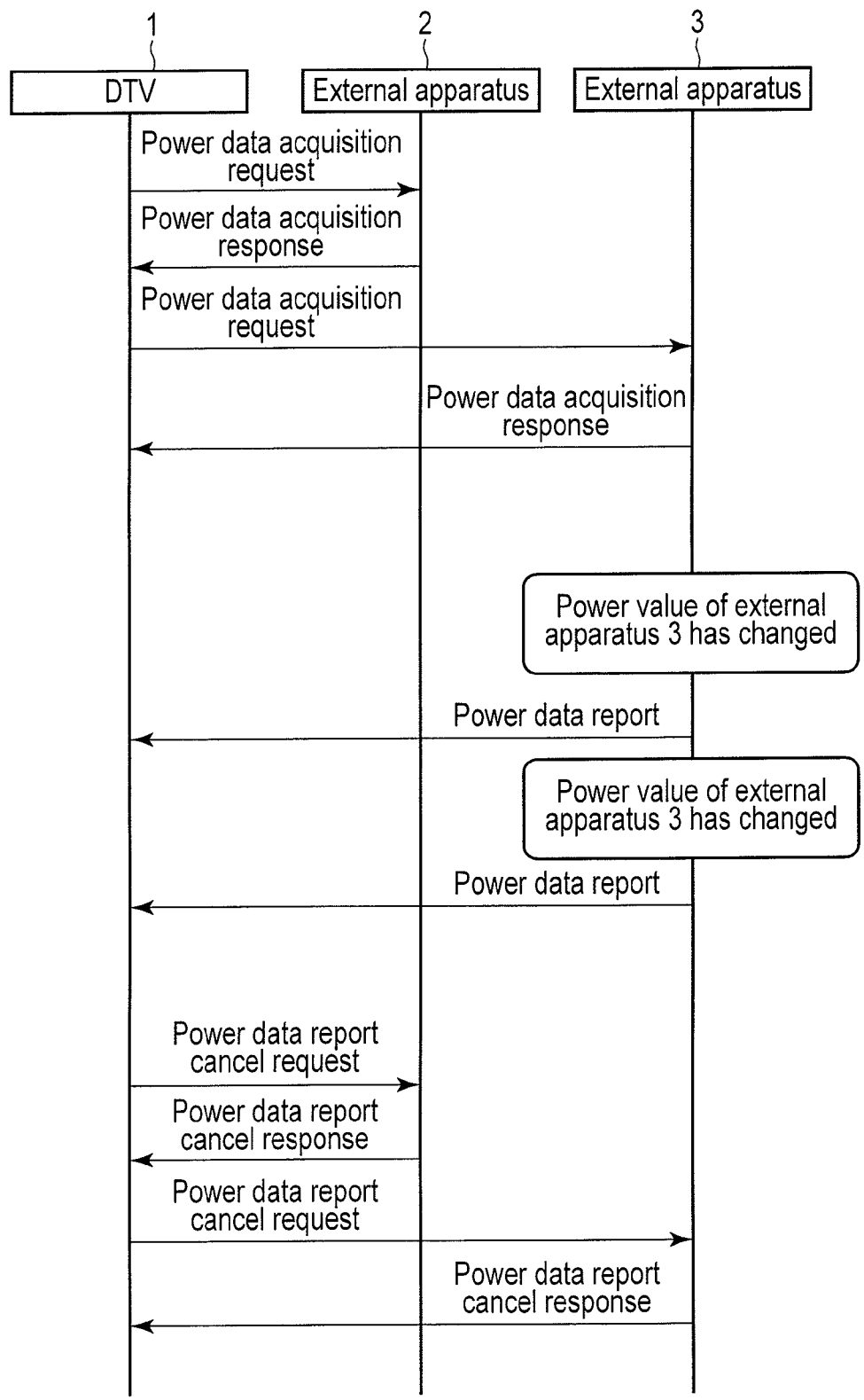
FIG. 13 is a chart for explaining a second example of power demand data acquisition processing.

As shown in FIG. 13, in order to acquire power demand data from the external apparatus 2, the DTV 1 issues a power data report request (power data report command) to the external apparatus 2. The power data report request requests power demand data to be reported according to a change in power demand. Likewise, the DTV 1 also issues power data report requests to the external apparatuses 3, 4, and 5.

Upon reception of the first power data report request, the external apparatus 2 measures the current power data (power demand) of itself, and returns a power data report response to the power data report request to the DTV 1. The power data report response includes the current power demand value of the external apparatus 2. Likewise, upon reception of the first power data report request, the external apparatus 3 measures the current power data (power demand) of itself, and returns a power data report response to the power data report request to the DTV 1. The power data report response includes the current power demand value of the external apparatus 3.

After that, when the power demand value has changed, each external apparatus sends a power data report including the changed power demand value to the DTV 1.

When the DTV 1 sends a power data report cancel request to each external apparatus, the external apparatus returns a power data report cancel response to cancel the power data report. That is, when the power demand value has changed during a period between the reception times of the power data report request and the power data report cancel request, each external apparatus sends a power data report including the changed power demand value to the DTV 1.

Third Example of Power Demand Data Acquisition

For example, each external apparatus reports power demand data (power demand values) to the DTV 1 at constant intervals. In response to this report, the DTV 1 acquires the power demand data from the external apparatus.

Figure 14:
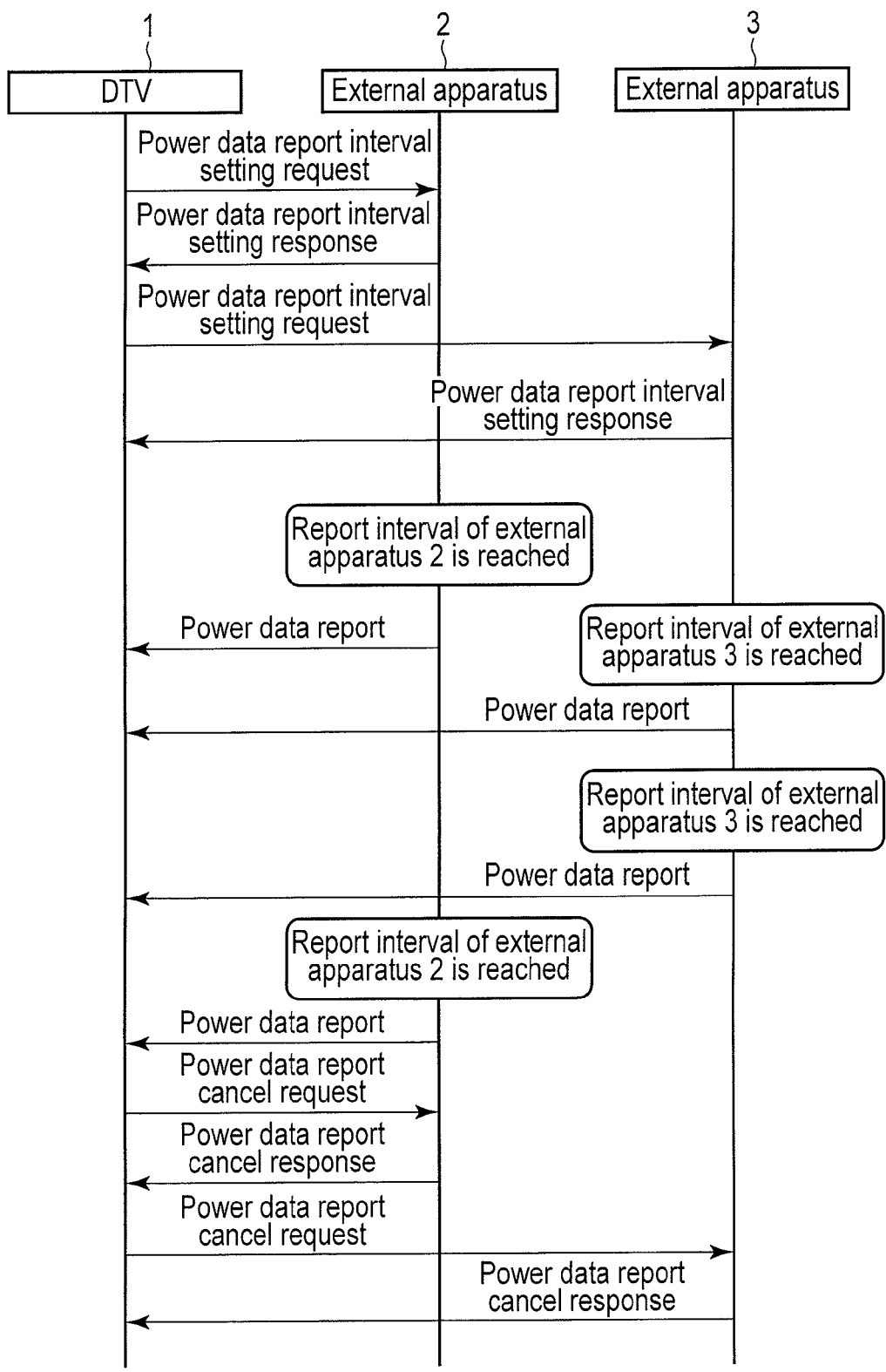
FIG. 14 is a chart for explaining a third example of power demand data acquisition processing.

As shown in FIG. 14, in order to acquire power demand data from the external apparatus 2 at first time intervals, the DTV 1 issues a power data report interval setting request to the external apparatus 2. The power data report interval setting request requests power demand data to be reported at the first time intervals. Likewise, in order to acquire power demand data from the external apparatus 3 at second time intervals, the DTV 1 issues a power data report interval setting request to the external apparatus 3. The power data report interval setting request requests power demand data to be reported at the second time intervals. Likewise, the DTV 1 issues power data report interval setting requests to the external apparatuses 4 and 5.

Upon reception of the first power data report interval setting request, the external apparatus 2 measures the current power data (power demand) of itself, and returns a power data report interval setting response to the power data report interval setting request to the DTV 1. The power data report interval setting response includes the current power demand value of the external apparatus 2. Likewise, upon reception of the first power data report interval setting request, the external apparatus 3 measures the current power data (power demand) of itself, and returns a power data report interval setting response to the power data report interval setting request to the DTV 1. The power data report interval setting response includes the current power demand value of the external apparatus 3.

After that, each external apparatus sends a power data report including the power demand value to the DTV 1 at the set time intervals.

When the DTV 1 sends a power data report cancel request to each external apparatus, the external apparatus returns a power data report cancel response to cancel the power data report. That is, during a period between the reception times of the power data report interval setting request and the power data report cancel request, each external apparatus sends a power data report including the changed power demand value to the DTV 1 at the set time intervals.

In the above description, selections of an external apparatus and item via the cursor have been explained. Note that the external apparatus and item may be selected by a selection unit other than the cursor. In the above description, various control operations via the control menu have been explained. Note that various control operations may be executed by a designation unit other than the control menu. That is, various methods are applicable to user interfaces.

In the above description, the case has been explained wherein the DTV 1 displays the power demands of the respective external apparatuses to control the operation of each external apparatus. Likewise, a communication apparatus such as a personal computer, cellphone, smartphone, or tablet computer may display the power demands of the respective external apparatuses to control the operation of each external apparatus.

In the above description, the case has been mainly explained wherein the DTV 1 displays the power demands of the respective external apparatuses to control the operation of each external apparatus using wireless communications. Likewise, the DTV 1 or the aforementioned communication apparatus may establish connections to the external apparatuses using Ethernet®, PLC, or the like to display the power demands of the respective external apparatuses and to control the operation of each external apparatus.

The power demand display and external apparatus control modes described in the above embodiments will be summarized below.

The DTV 1 can relatively and clearly report the power demands of the respective external apparatuses by at least one of the first to fourth power demand display modes. Thus, the user can intuitively recognize the power demands of the respective external apparatuses, thus improving the user's convenience. Furthermore, the DTV 1 can simplify operations required to control each external apparatus by combining the above display mode and the first and second external apparatus control modes, thus obtaining an energy saving promoting effect.

For example, the DTV 1 displays the power demands of the respective external apparatuses using the graph, and the user can select a desired external apparatus from the displayed graph to turn off the power of the selected external apparatus so as to attain energy savings. Also, the user can select a desired external apparatus from the displayed graph to decrease the heating setting temperature or to increase the cooling setting temperature of the selected apparatus, so as to lower the power demands of the external apparatus.

According to at least one of the aforementioned embodiments, the electronic apparatus and data output method, which allow the user to confirm the power demands of respective external apparatuses and also to control each external apparatus can be provided.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a reception module to receive a selection input and a control input;
   a receiver to receive a first power consumption information of a first apparatus from the first apparatus and a second power consumption information of a second apparatus from the second apparatus;
   a display controller to:
      display, based on each of the first power consumption information and the second power consumption information, a first screen on a display, the first screen including a plurality of images corresponding to each of the first apparatus and the second apparatus used to display relative power consumption of the first apparatus and the second apparatus, and
      display, if the reception module receives the selection input of a first image corresponding to the first apparatus or a second image corresponding to the second apparatus which is selected from the plurality of images included in the first screen, a second screen on the display, the second screen including a first control image or a second control image used to control the first apparatus or the second apparatus; and
   a controller to control the first apparatus the first apparatus or the second apparatus based on the control input if the reception module receives the control input for the first or second control image on the display,
wherein the display controller distinguishes between the first image corresponding to the first apparatus in an operation power state and the second image corresponding to the second apparatus in a standby power state, the first and second images included in the plurality of images in the first screen, and
the display controller displays the first image corresponding to the first apparatus in the operation power state in a first area and the second image corresponding to the second apparatus in the standby power state in a second area distant from the first area.

2. The apparatus of claim 1, wherein the reception module accepts the selection of the first apparatus via a cursor on the display.

3. The apparatus of claim 1, wherein the display displays a percentage of the power consumption of the first apparatus and a percentage of the power consumption of the second apparatus by means of a graph.

4. The apparatus of claim 1, wherein the reception module accepts the selection of the first apparatus in the operation power state in which power usage is higher than in the standby power state, and accepts a first change instruction to change the first apparatus from the operation power state to the standby power state, and
the controller sends a power control signal to change a power state of the first apparatus based on the first change instruction.

5. The apparatus of claim 4, wherein the reception module accepts a selection of the second apparatus in the standby power state in which power usage is lower than in the operation power state, and accepts a second change instruction to change the second apparatus from the standby power state to the operation power state, and
the controller sends the power control signal to change the power state of the second apparatus based on the second change instruction.

6. The apparatus of claim 5, wherein the display separately displays the first image corresponding to the first apparatus and the second image corresponding to the second apparatus.

7. The apparatus of claim 6, wherein the receiver receives power information associated with power consumption of a third apparatus from the third apparatus,
the display displays relative power consumption of the third apparatus based on the power information, and the display displays relative power consumption of the first apparatus in the operation power state and the third apparatus in the operation power state, and separately displays the first image corresponding to the first apparatus in the operation power state and a third image corresponding to the third apparatus in the operation power state from the second apparatus in the standby power state.

8. A data output method comprising:
receiving, by a receiver, a first power consumption information of a first apparatus from the first apparatus and a second power consumption information of a second apparatus from the second apparatus;
displaying, based on each of the first power consumption information and the second power consumption information, a first screen on a display by a display controller, the first screen including a plurality of images corresponding to each of the first apparatus and the second apparatus used to display relative power consumption of the first apparatus and the second apparatus;
displaying, if a reception module receives a selection input of a first image corresponding to the first apparatus or a second image corresponding to the second apparatus which is selected from the plurality of images included in the first screen, a second screen on the display by the display controller, the second screen including a first control image or a second control image used to control the first apparatus or the second apparatus; and
controlling, by a controller, the first apparatus or the second apparatus based on a control input if the reception module receives the control input for the first or second control image on the display.

9. The method of claim 8, further comprising:
distinguishing, by the display controller, between the first image corresponding to the first apparatus in an operation power state and the second image corresponding to the second apparatus in a standby power state, the first and second images included in the plurality of images in the first screen, and
displaying, by the display controller, the first image corresponding to the first apparatus in the operation power state in a first area and the second image corresponding to the second apparatus in the standby power state in a second area distant from the first area.

* * * * *